(12) United States Patent
Pal Chowdhury et al.

(10) Patent No.: US 11,645,155 B2
(45) Date of Patent: May 9, 2023

(54) SAFE-STATING A SYSTEM INTERCONNECT WITHIN A DATA PROCESSING SYSTEM

(71) Applicant: NXP B.V., Eindhoven (NL)

(72) Inventors: Arjun Pal Chowdhury, Austin, TX (US); Nancy Hing-Che Amedeo, Austin, TX (US); Jehoda Refaeli, Austin, TX (US)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 17/249,155

(22) Filed: Feb. 22, 2021

(65) Prior Publication Data

US 2022/0269563 A1 Aug. 25, 2022

(51) Int. Cl.
*G06F 11/00* (2006.01)
*G06F 11/14* (2006.01)
*G06F 11/07* (2006.01)
*G06F 13/40* (2006.01)

(52) U.S. Cl.
CPC ........ *G06F 11/141* (2013.01); *G06F 11/0772* (2013.01); *G06F 11/1428* (2013.01); *G06F 11/1441* (2013.01); *G06F 13/4027* (2013.01); *G06F 13/4068* (2013.01)

(58) Field of Classification Search
CPC . G06F 11/141; G06F 11/0772; G06F 11/1441
USPC ...................................................... 714/1–57
See application file for complete search history.

(56) References Cited

U.S. PATENT DOCUMENTS 6,065,135 A 5/2000 Marshall et al.
6,148,348 A 11/2000 Garnett et al.
7,827,441 B1 * 11/2010 Wenzel ............... G06F 11/1076
　　　　　　　　　　　　　　　　　　　　　711/131
8,868,941 B2 10/2014 Jayasimha et al.
10,761,939 B1 * 9/2020 Xu ........................ G06F 11/141
10,802,932 B2 10/2020 Refaeli et al.
2002/0144179 A1 * 10/2002 Cmelik ............... G06F 9/30087
　　　　　　　　　　　　　　　　　　　　　714/17
2005/0015648 A1 * 1/2005 Tawada .................. G11B 27/36
2005/0114556 A1 * 5/2005 Solomon ............... G06F 13/423
　　　　　　　　　　　　　　　　　　　　　710/5

(Continued)

FOREIGN PATENT DOCUMENTS

CN　　　　111581003 A　　　8/2020

OTHER PUBLICATIONS

Arm: "Arm CoreLink SIE-300 AXI5 System IP for Embedded" Revision: r0p0, Technical Reference Manual, 101526_0000_01_en, 2019, pp. 1-105.

*Primary Examiner* — Sarai E Butler

(57) ABSTRACT

A data processing system includes a system interconnect, a first master, and a bridge circuit. The bridge circuit is coupled between the first master and the system interconnect. The bridge circuit is configured to, in response to occurrence of an error in the first master, isolate the first master from the system interconnect, wherein the isolating by the bridge circuit is performed while the first master has one or more outstanding issued write commands to the system interconnect which have not been completed. The bridge circuit is further configured to, after isolating the first master from the system interconnect, complete the one or more outstanding issued write commands while the first master remains isolated from the system interconnect.

18 Claims, 7 Drawing Sheets

(56) References Cited

U.S. PATENT DOCUMENTS

| | | | |
|---|---|---|---|
| 2005/0240811 A1* | 10/2005 | Safford | G06F 11/1641 714/11 |
| 2006/0083081 A1* | 4/2006 | Park | G11C 7/1066 365/191 |
| 2006/0212762 A1* | 9/2006 | Zimmer | G11B 20/1883 |
| 2007/0028060 A1* | 2/2007 | Ware | G11C 11/4063 711/154 |
| 2007/0088975 A1* | 4/2007 | Ashmore | G06F 11/2069 714/6.1 |
| 2007/0180329 A1* | 8/2007 | Lanus | G06F 11/004 714/E11.144 |
| 2008/0126843 A1* | 5/2008 | Nygren | G06F 11/1004 714/E11.03 |
| 2008/0162803 A1* | 7/2008 | Masuo | G06F 3/0659 711/E12.019 |
| 2009/0254693 A1* | 10/2009 | Karamanolis | G06F 11/1458 711/E12.001 |
| 2009/0287954 A1* | 11/2009 | Hikabe | H04L 49/557 714/4.11 |
| 2012/0047306 A1 | 2/2012 | Mitsubayashi | |
| 2013/0031284 A1 | 1/2013 | Yun et al. | |
| 2015/0067387 A1* | 3/2015 | Liao | G06F 11/1443 714/6.3 |
| 2015/0098275 A1* | 4/2015 | Kim | G06F 13/1689 365/185.18 |
| 2016/0109926 A1* | 4/2016 | Achtenberg | G06F 12/023 713/320 |
| 2016/0139837 A1* | 5/2016 | Welker | G06F 11/1004 711/155 |
| 2019/0171536 A1 | 6/2019 | Refaeli et al. | |
| 2019/0205489 A1 | 7/2019 | de Lescure et al. | |
| 2021/0158848 A1* | 5/2021 | Goo | G11C 7/1051 |

\* cited by examiner

SAFE-STATING A SYSTEM INTERCONNECT WITHIN A DATA PROCESSING SYSTEM

BACKGROUND

Field

This disclosure relates generally to a data processing system, and more specifically, to safe-stating a system interconnect within a data processing system in response to a faulty master.

Related Art

In safety critical applications such a medical, space, autonomous driving, etc., it is important to guarantee overall system reliability and recover from a fault situation. Running critical application cores or modules in lockstep mode is one common technique to improve reliability. In one example, the recovery mechanism involves resetting the faulty lockstep unit while the rest of the system operates un-interruptedly. In such mechanisms, the faulty master is relied on to continue system bus transfers after occurrence of the fault until all outstanding transactions are flushed. However, if the master is faulty, it may not be able to work reliably to drain all the outstanding transactions. Any protocol violation on the system bus interface or issuance of a wrong command by the faulty master can cause system memory corruption or the system to hang. Therefore, a need exists for an improved way to handle a faulty master, in which outstanding commands initiated prior to occurrence of the fault can be gracefully finished without reliance on the faulty master.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, in an SoC, a bridge circuit coupled between a master and the system interconnect keeps track of issued write commands in a command buffer during normal operation such that when an error occurs in the master, the bridge circuit rather than the faulty master is able to gracefully complete the issued write commands. When an error in the master is indicated, the bridge circuit first isolates the faulty master from the system interconnect, regardless of any outstanding write commands or write data previously issued to the system interconnect. While the faulty master is isolated from the system interconnect, the bridge circuit uses the command buffer to ensure all outstanding write transactions are drained without resulting in protocol violations on the system interconnect. This is accomplished by the bridge circuit issuing dummy data to complete the write transactions. After draining the write transactions (and any outstanding read transactions), the faulty master can be safely reset (without needing to reset the entire SoC).

In addition, if the protocol of the system interconnect allows write data to be issued prior to corresponding write commands, the command buffer is further used to keep track of the status of issued write data with respect to issued write commands such that, upon occurrence of the error in the master, any issued write data can be effectively handled as well to completely drain all write commands. This is accomplished by the bridge circuit issuing dummy write commands to process the issued write data. In this case, draining the write transactions includes draining dummy write commands such that all outstanding write commands and write data is properly processed without protocol violations and without relying on the faulty master after occurrence of the error.

Figure 1:
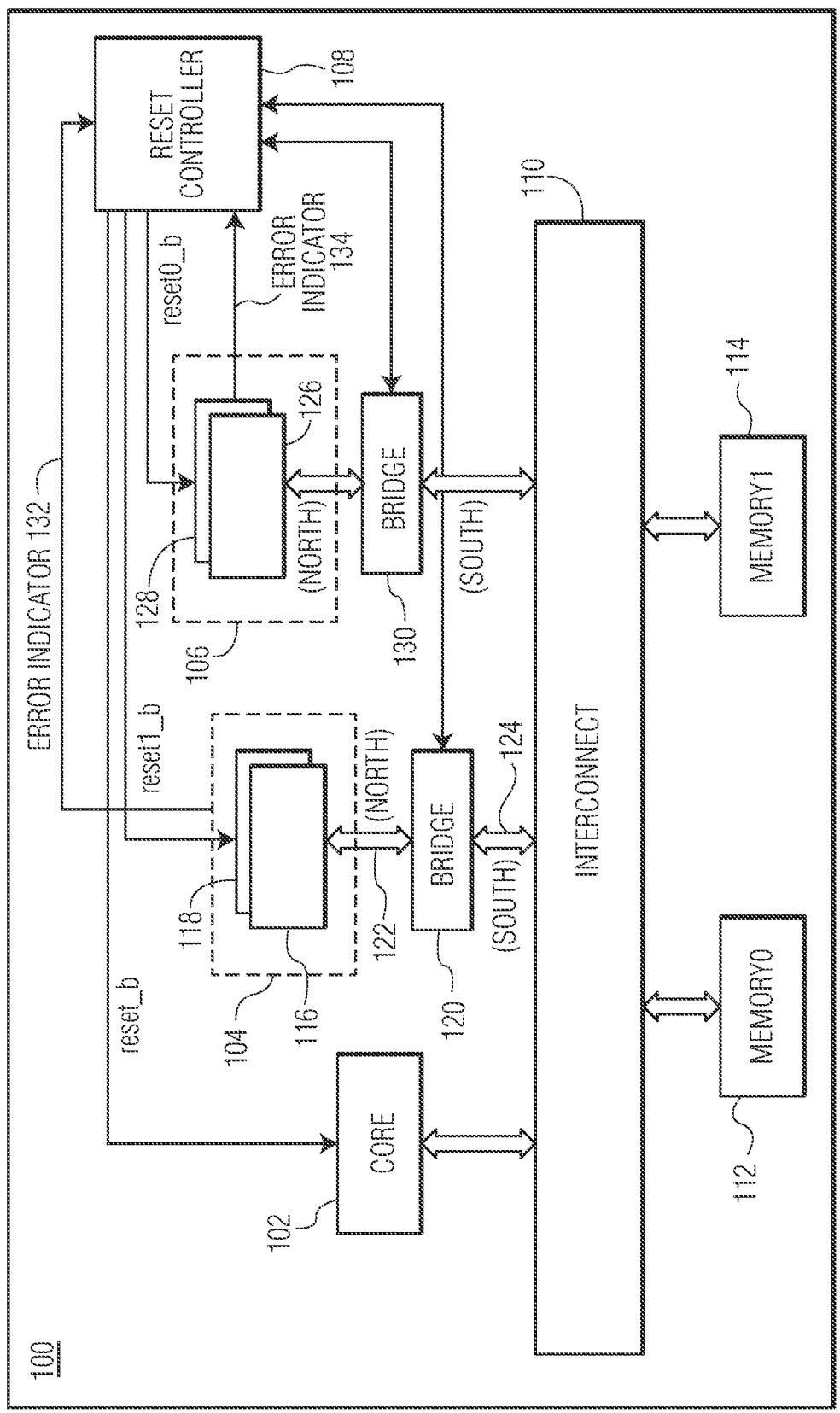
FIG. 1 illustrates, in block diagram form, a data processing system having bridges coupled between corresponding lockstep units and a system interconnect, in accordance with one embodiment of the present invention.

FIG. 1 illustrates, in block diagram form, a data processing system 100, in accordance with one embodiment of the present invention. In one embodiment, system 100 is implemented on a single integrated circuit, as a system on a chip (SoC), and includes a core 102, lockstep units 104 and 106, bridge circuits 120 and 130 (also referred to as bridges 120 and 130, respectively), a reset controller 108, memories 112 and 114, and a system interconnect 110. Memories 112 and 114 and core 102 are bidirectionally coupled to interconnect 110. Lockstep unit 104 includes lockstep cores 116 and 118, in which one core (e.g. core 116) of the lockstep unit may be referred to as the functional core and the other (e.g. core 118) as the shadow core. Similarly, lockstep unit 106 includes lockstep cores 126 and 128. In each lockstep unit, the cores operate in lockstep, performing the same operations. Core 116 of lockstep unit 104 is bidirectionally coupled to bridge 120 at a north interface of bridge 120 via conductors 122, and bridge 120 is bidirectionally coupled to interconnect 110 at a south interface of bridge 120 via conductors 124. Similarly, core 126 of lockstep unit 106 is bidirectionally coupled to bridge 130 at a north interface of bridge 130 via a set of conductors, and bridge 130 is bidirectionally coupled to interconnect 110 at a south interface of bridge 130 via a set of conductors. The terms north and south interfaces are intended to refer to two distinct interfaces of each bridge, and not necessarily to the physical locations of the interfaces. While the lockstep units of FIG. 1 include lockstep cores, alternatively, a lockstep unit may include any two or more masters of any type operating in lockstep.

Reset controller 108 is coupled to receive an error indicator 132 from lockstep unit 104 and an error indicator 134 from lockstep unit 106. Reset controller 108 is also bidirectionally coupled to each of bridges 120 and 130. Reset controller also provides active low reset signals, such as reset_b, to core 102, reset1_b to lockstep unit 104, and reset0_b to lockstep unit 106. Memories 112 and 114 can each be any type of memories, such as any type of random access memory (RAM). In another embodiment, either memory 112 or 114 can be any type of slave, and thus may be referred to as slave 112 or slave 114. System interconnect 110 may also be referred to as system bus 110, in which system bus 110 can be any type of bus implementing any type of bus protocol or can be implemented as a different type of interconnect, such as a cross-bar switch or other interconnect fabric. Therefore, although the terms bus, bus masters, and bus protocol may be used herein, the term "bus" can refer to any type of interconnect to communicate signals between bus masters (e.g. cores) and target devices (e.g. memories) within system 100. Also, note that bus masters can simply be referred to as masters, in which a master can communicate with targets via any type of system interconnect. Note that in alternate embodiments, system 100 can include any number of lockstep units with corresponding bridges, any number of slaves (e.g. memories), and any number of cores or other elements, as needed.

In operation, the cores of the lockstep units communicate with other devices in system 100, such as memories 112 and 114, by way of system interconnect 110. The communication between the cores of the lockstep units and system interconnect 110 occurs via a corresponding bridge. During normal operation, when no errors have been detected in lockstep units 104 and 106, each bridge operates as a flow through unit in which all read and write transactions initiated by a bus master coupled to the bridge reach the targets without incurring additional latencies through the corresponding bridge. However, upon occurrence of an error in any of the cores coupled to a bridge, the corresponding bridge will immediately isolate the faulty core's interface from the corresponding bridge (and thus from interconnect 110) so that the lockstep unit with the faulty core can be placed in reset by reset controller 108. By immediately isolating the faulty core, the faulty core is prevented from causing problems such as by issuing write commands to unintended address locations or corrupt a write channel with meaningless data. The faulty core is also not relied upon to finish any existing transactions. Instead, after occurrence of the error, the corresponding bridge ensures that all outstanding transactions which were issued prior to the error are gracefully completed. Upon the corresponding bridge completing the outstanding transactions, reset controller 108 can safely reset the lockstep unit with the faulty core.

Note that each bridge circuit of system 100 may be referred to as a fence and drain (FND) circuit which fences (i.e. isolates) a faulty master and drains (e.g. completes) outstanding transactions in response to an error (e.g. lockstep error) in the fault master. In the illustrated embodiment, each bridge is coupled between a corresponding lockstep unit and system interconnect 110. Therefore, the error indicator provided to reset controller 108 from each lockstep unit may specifically indicate a lockstep error (e.g. a situation which results in loss of lockstep between the lockstep masters). However, in alternate embodiments, a bridge may be coupled between a single master, or a non-lockstep master (such as a non-lockstep core), and system interconnect 110. In this case, the error indicator may simply indicate any error which could result in faulty operation of the single master or non-lockstep master.

Figure 2:
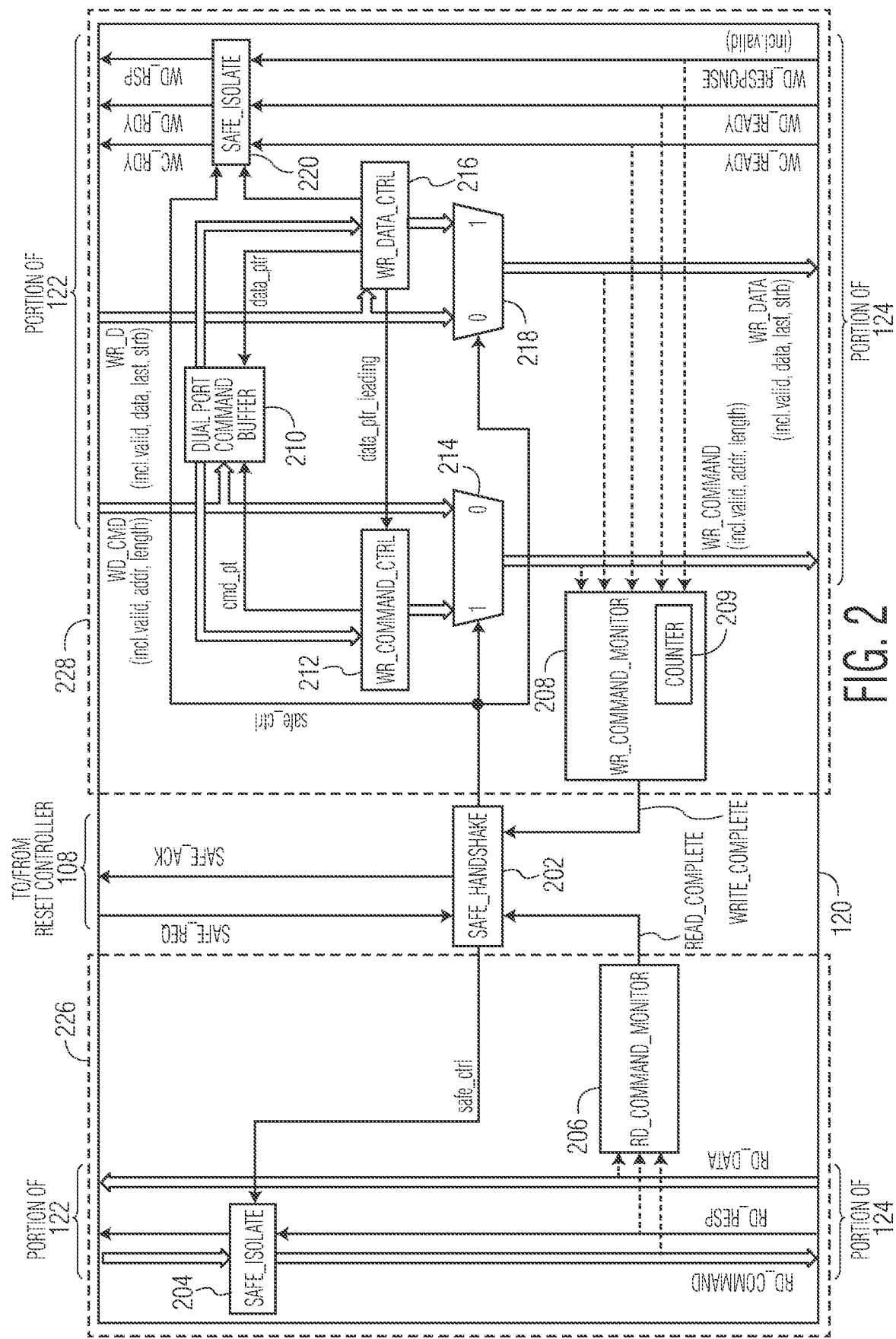
FIG. 2 illustrates, in block diagram form, a bridge of the data processing system of FIG. 1, in accordance with one embodiment of the present invention.

FIG. 2 illustrates, in block diagram form, bridge 120 (corresponding to lockstep unit 104) in further detail, in accordance with one embodiment of the present invention. Bridge 120 includes a SAFE_HANDSHAKE circuit 202, SAFE_ISOLATE circuits 204 and 220, a read command monitor (RD_COMMAND_MONITOR) 206, a write command monitor (WR_COMMAND_MONITOR) 208, a dual port command buffer 210, a write command control circuit (WR_COMMAND_CTRL) 212, and a write data control circuit (WR_DATA_CTRL) 216, and multiplexers (MUXes) 214 and 218. WR_COMMAND_CTRL 212 and WR_DATA_CTRL 216 may be referred to collectively as control circuitry. MUXes 214 and 218 may be referred to as selection circuitry.

Bridge 120 includes a FND_SAFE_READ portion 226 to take care of read transactions and a FND_SAFE_WRITE portion 228 to take care of write transactions. SAFE_HANDSHAKE circuit 202 communicates handshake signals with reset controller 108. The signals within FND_SAFE_READ portion 226 and FND_SAFE_WRITE portion 228 at the top of the page are communicated with core 116 of lockstep unit 104 as part of conductors 122 at the north interface of bridge 120, and the signals within FND_SAFE_READ portion 226 and FND_SAFE_WRITE portion 228 at the bottom of the page are communicated with system interconnect 110 as part of conductors 124 at the south interface of bridge 120.

Within read portion 226, read commands are provided via RD_COMMAND from lockstep unit 104 and read response control signals are provided via RD_RESP and read data via RD_DATA from interconnect 110. RD_COMMAND and RD_RESP are communicated through SAFE_ISOLATE circuit 204, in which, during normal operation with safe_ctrl negated, SAFE_ISOLATE circuit 204 simply allow these signals to pass through transparently, i.e. unaffected. RD_COMMAND_MONITOR 206 is coupled to RD_COMMAND, RD_RESP, and RD_DATA and provides a READ_COMPLETE indicator to SAFE_HANDSHAKE 202.

With write portion 228, write commands and write data are provided via WR_CMD and WR_D, respectively, from core 116 to first inputs of MUXes 214 and 218, respectively. The write commands received on WR_CMD are stored into dual port command buffer 210. In one embodiment, command buffer 210 is implemented as a circular buffer. WR_COMMAND_CTRL 212 controls a first pointer, cmd_ptr, into buffer 210 which keeps track of the stored commands in the buffer. WR_DATA_CTRL 216 controls a second pointer, data_ptr, into command buffer 210 and keeps track of the write commands for which corresponding write data has been issued. Details of the cmd_ptr and data_ptr will be described in further detail with respect to FIG. 3 below.

WR_DATA_CTRL 216 provides a data_ptr_leading indicator to WR_COMMAND_CTRL. WR_COMMAND_CTRL provides a dummy write command to a second input of MUX 214, and WR_DATA_CTRL 216 provides a dummy data value to the second input of MUX 218. During normal operation, with safe_ctrl negated (to a logic level zero), WR_CMD is provided as WR_COMMAND via MUX 214 to interconnect 110 via a portion of conductors 124, and WR_D is provided as WR_DATA via MUX 218 to interconnect 110 via a portion of conductors 124. Also, during normal operation with safe_ctrl negated, write command ready (WC_READY), write data ready (WD_READY), and a write response (W_RESPONSE) are provided through SAFE_ISOLATE circuit 220, unaffected, as WC_RDY, WD_RDY, and W_RSP to lockstep unit 104 via a portion of conductors 122. WR_COMMAND_MONITOR 208 is coupled to WR_COMMAND, WR_DATA, WC_READY, WD_READY, and W_RESPONSE and provides a WRITE_COMPLETE indicator to SAFE_HANDSHAKE circuit 202. WR_COMMAND_MONITOR 208 also includes a command counter 209 which keeps a count of outstanding write commands.

Figure 3:
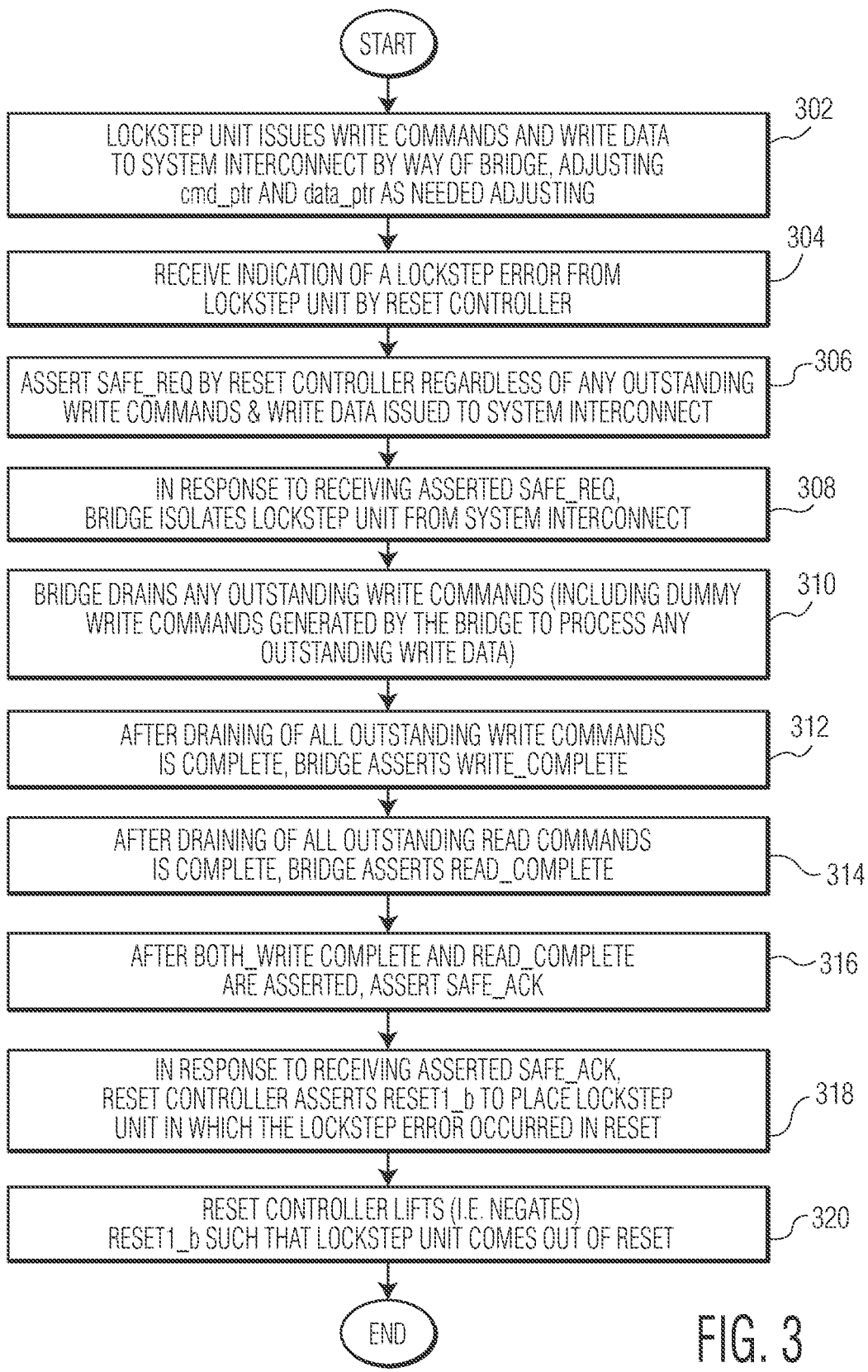
FIG. 3 illustrates, in flow diagram form, a method of responding to a lockstep error within the data processing system of FIG. 1, in accordance with one embodiment of the present invention.

Operation of bridge 120 will be described with respect to the flow diagram of FIG. 3. FIG. 3 will be described in reference to core 116, lockstep unit 104, and bridge 120 of FIGS. 1 and 2. Note that core 116 (and its shadow core 118) can alternatively be any type bus master. FIG. 3 begins in block 302 with lockstep unit 104 operating in normal operation (without an error), in which error indicator 132 is negated. During normal operation, core 116 issues write commands and write data to system interconnect 110 by way of bridge 120, which adjusts the cmd_ptr and data_ptr into buffer 210 as needed. A write command from core 116 can be a burst write, in which each burst write command includes a corresponding write access address (addr) as well as corresponding control signals, such as a valid indicator (valid), and a burst length (length). The burst length indicates how many beats of data is provided as part of the burst write. Each beat may include any number of bytes, such as 32 bytes in one example. Therefore, a burst length of 10 for a burst write would indicate a write of 10 beats of 32 bytes each, starting at the write access address. A write command can also be a non-burst write, in which a single beat of data is written. The corresponding write data (burst write data for a burst write) includes, in addition to the write data itself, corresponding control signals, such as a valid indicator (valid), a data strobe (strb) and a last indicator (last). The last indicator indicates whether or not the current beat is the last beat in the burst write. In one embodiment, strb may be a multi-bit signal with one bit corresponding to each byte of write data, in which the corresponding strb bit is asserted with the data. Thus, strb may be referred to as bytestrobes.

In the current example, it is assumed that the protocol of system interconnect 110 has no ordering requirement between write commands and write data. This allows for the issuance of write data to precede the issuance of the corresponding write commands. For example, system interconnect 110 may be implemented as an AXI bus, thus adhering to an AXI protocol. As used herein, a write command or write data is issued by core 116 when it is provided to bridge 120.

Referring to bridge 120, during normal operation, safe_ctrl is negated such that SAFE_ISOLATE circuits 204 and 220 simply pass all signals unaffected (unmodified), and the first inputs of MUXES 214 and 218 are selected such that WR_CMD and WR_D are provided directly (i.e. unmodified) as WR_COMMAND and WR_DATA to system interconnect 110. During normal operation, providing the write command or write data to bridge 120 immediately issues the write command or write data to interconnect 110, without incurring additional latency. Dual port command buffer 210 stores all write commands received on WR_CMD. Therefore, the commands stored in buffer 210 correspond to commands which have been issued by core 116 to interconnect 110.

In one embodiment, buffer 210 is a first-in first-out (FIFO) buffer and can be implemented as a circular buffer. The depth of buffer 210 should be equal to or greater than the maximum number of outstanding (i.e. issued) write commands supported by interconnect 110. Due to the small size of buffer 210, it may be implemented as registers, and therefore, each entry may be referred to as a command register or a command buffer. Each received write command on WR_CMD is pushed (i.e. stored) into buffer 210 (including the corresponding burst length). Each time a write command is stored in buffer 210, WR_COMMAND_CTRL 212 increments the cmd_ptr to keep track of the head of the FIFO. WR_DATA_CTRL 216 monitors the issued write data on WR_D. Each time data WR_DATA_CTRL 216 observes a "last beat" of data (indicated by the control signal "last" being asserted), WR_DATA_CTRL increments data_ptr. Therefore, data_ptr keeps track of the issued write commands which have corresponding issued write data.

If write data is issued before the corresponding write command, then a write command placeholder (e.g. a dummy value) is pushed onto buffer 210, but the cmd_ptr is not incremented in this case (because an actual write command has not yet been issued). Along with the write command placeholder, the burst length of the write is also stored. WR_DATA_CTRL 216 keeps track of the number of data beats issued for a current burst write, and upon receiving the last data beat, it can determine the burst length which can be stored in buffer 210 as part of the write command placeholder. If the corresponding write command does subsequently arrive, then the write command placeholder can be overwritten with the actual write command.

If the data_ptr catches up (i.e. is equal to) the cmd_ptr, then it is known that there are no outstanding (issued) write commands without issued write data, and there is no outstanding (issued) write data whose corresponding write command has not yet been issued. If the cmd_ptr is ahead of the data_ptr, then there are outstanding (issued) write commands without the corresponding write data having been issued yet. In either of these scenarios, the data_ptr_leading indicator is negated. However, if data_ptr is ahead of the cmd_ptr, then there is outstanding (issued) data whose corresponding write commands have not yet been issued, and the data_ptr_leading indicator is asserted. Therefore, the data_ptr_leading indicator from WR_DATA_CTRL 216 to WR_COMMAND_CTRL 212 indicates to WR_COMMAND_CTRL 212 whether there is outstanding issued data. In this manner, through the use of the cmd_ptr and the data_ptr into command buffer 210, command buffer 210 tracks issued write commands as well as the status of issued write data with respect to the issued write commands.

Counter 209 in WR_COMMAND_MONITOR 208 maintains a count of outstanding (i.e. pending) write commands. It monitors WR_COMMAND (which is the same as WR_CMD in normal operation), WR_DATA (same as WR_D in normal operation), WC_READY (same as WC_RDY in normal operation), WD_READY (same as WD_RDY in normal operation), and W_RESPONSE. A valid write command is held on WR_COMMAND until system interconnect 110 is ready to receive a next write command (indicated by the assertion of WC_READY). When interconnect 110 is ready (WC_READY is asserted) and a valid write command is issued (the valid bit on WR_COMMAND, WR_COMMAND_VALID, is asserted), the write command is provided to interconnect 110 and counter 209 is incremented to indicate that a write command has been issued to interconnect 110.

Similarly, write data is held on WR_DATA until system interconnect is ready (indicated by the assertion of WD_READY). When interconnect 110 is ready (WD_READY is asserted) and valid write data is issued (WR_DATA_VALID is asserted), the write data with a corresponding asserted strobe signal (WR_DATA_STRB) is provided to interconnect 110. Upon completion of a write command by a target device, system interconnect 110 provides a response via W_RESPONSE (which includes a valid bit as well, W_RESPONSE_VALID). When the valid bit of the response is asserted, counter 209 is decremented to represent one fewer outstanding write command. Also at this time, the corresponding write command can be removed from command buffer 210 by, for example marking that entry as empty in buffer 210. (Note that additional circuitry may be present in bridge 120 to control typical FIFO operations for buffer 210, such as storing new values or removing values (i.e. pushing or popping values)).

On the read side, during normal operation, RD_COMMAND_MONITOR 206 keeps a count of outstanding read commands. Read commands are issued to interconnect 110 via RD_COMMAND on a portion of conductors 124, and read data and response control signals are returned from interconnect 110 to lockstep unit 104 via RD_DATA and RD_RESP, respectively.

Referring back to FIG. 3, while in normal operation, an error may occur in lockstep unit 104. For example, a lockstep error may occur in which lockstep operation between cores 116 and 118 is lost. Alternatively, a different type of error may occur in core 116. In response to having a faulty core, lockstep unit 104 asserts error indicator 132 to indicate the error to reset controller 108 (block 304 of FIG. 3). Upon receiving the indication of an error, reset controller 108 asserts SAFE_REQ (block 306) to request that system interconnect 110 be safe-stated. This begins the fence and drain operation of bridge 120 to isolate the faulty master and gracefully complete outstanding transactions. Note that SAFE_REQ is asserted by reset controller 108 in response to the occurrence of the error, regardless of any outstanding write commands or write data issued to system interconnect 110.

In bock 308, in response to receiving the asserted SAFE_REQ, bridge 120 isolates faulty master (core 116) from system interconnect 110. Bridge 120 does this by asserting safe_ctrl (to a logic level one). For example, SAFE_HANDSHAKE circuit 202 receives the asserted SAFE_REQ and asserts safe_ctrl. This results in SAFE_ISOLATE circuit 220 decoupling WC_RDY, WD_RDY, and W_RSP (all at the north interface) from WC_READY, WD_READY, and W_RESPONSE (all at the the south interface), respectively. Assertion of safe_ctrl also results in MUX 214 providing the output of WR_COMMAND_CTRL 212 as WR_COMMAND instead of providing WR_CMD, and results in MUX 216 providing the output of WR_DATA_CTRL 216 as WR_DATA instead of providing WR_D. In this manner, write commands issued from lockstep unit 104 to bridge 120 on WR_CMD cannot reach interconnect 110 and cause problems within system 100. WR_COMMAND_MONITOR 208 monitors WC_READY, WD_READY, and W_RESPONSE but they are not provided back to lockstep unit 104 due to the decoupling by SAFE_ISOLATE circuit 220.

Similarly, with safe_ctrl asserted, SAFE_ISOLATE circuit 204 does not allow read commands from lockstep unit 104 to be provided to RD_COMMAND, and does not allow RD_RESP to be provided back to lockstep unit 104. The RD_DATA can be returned to core 116, but since lockstep unit 104 will be reset (in block 318), the RD_DATA will not be accepted and thus not cause problems within core 116. RD_COMMAND_MONITOR 206 monitors RD_COMMAND, RD_RESP, and RD_DATA.

Since core 116 is a faulty core, waiting on core 116 to complete any outstanding write commands could be problematic. For example, due to the faulty core, the outstanding commands may not be properly completed at all (which could hang up system 100), or other write commands may continue to be issued which can corrupt data in system 100. Therefore, the faulty core is not relied upon to complete the transactions. Instead, in block 310, after bridge 120 has isolated lockstep unit 104, bridge 120 drains (completes) any outstanding write commands (including dummy write commands generated by bridge 120 to process any outstanding write data). The draining of outstanding write commands (as well as the generation and draining of dummy write commands) by bridge 120 will be described below, with examples provided in the timing diagrams of FIGS. 4-6. Bridge 120 ensures that all outstanding write commands are gracefully completed and that any outstanding write data is properly processed, so as not to violate the bus protocol of system interconnect 110. Furthermore, by having bridge 120 perform these actions, a faulty core (or other faulty master) is not relied upon to drain or complete any outstanding transactions. This improves reliability of system 100.

To drain the outstanding write commands in buffer 210 and address any outstanding write data (performed in block 310 of FIG. 3), bridge 120 creates any remaining transactions while the actual faulty master is isolated from bridge 120. If there are outstanding commands in command buffer 210, WR_DATA_CTRL 216 creates dummy write beats which are provided via MUX 218 onto WR_DATA to interconnect 110. However, any time a dummy write beat is created and provided onto WR_DATA, the corresponding strobe signal, WR_DATA_STRB, stays negated. (In the case of multi-bit bytestrobes, all strobe bits remain negated.) Without assertion of a strobe signal with write data provided to interconnect 110, the write data is prevented from being written to any target device (e.g. to any memory of system 100). The outstanding commands in command buffer 210 provide the corresponding burst lengths so that WR_DATA_CTRL 216 can create the appropriate dummy write beats, and assert WR_DATA_LAST with the last beat of each burst write. WR_DATA_CTRL 216 continues to provide the appropriate dummy write data beats for each issued write command in buffer 210 from lockstep unit 104. WR_DATA_CTRL 216 can also increment the data_ptr with each dummy last write beat.

If there is outstanding data for which command placeholders are still stored in buffer 210 (indicated to WR_COMMAND_CTRL 212 by the assertion of data_ptr_leading), WR_COMMAND_CTRL 212 generates and issues self-initiated dummy write commands for the write command placeholders in buffer 210 (which were created when write data arrived to bridge 120 prior to the corresponding write command). If an error occurs (resulting in assertion of SAFE_REQ) while burst write data is being received but prior to the corresponding write command being issued, then the actual burst length is not yet known and cannot be determined. In this situation, WR_DATA_CTRL 216 adds one to the current beat count for the received data and stores this value as the burst length with the corresponding command placeholder.

The dummy write commands generated by WR_COMMAND_CTRL 212 for the command placeholders in buffer 210 are provided via the second input of MUX 214 onto WR_COMMAND. For these dummy write commands, WR_COMMAND_CTRL 212 generates a pre-determined safe target address for the write command, which, if overwritten, does not have any impact on system 100, or, if so configured, can generate a bus error. WR_COMMAND_VALID is also asserted with these dummy write commands on WR_COMMAND. As with write commands during normal operation, a dummy write command remains on WR_COMMAND until WC_READY is asserted, and the cmd_ptr can be incremented when the dummy command is issued to system interconnect 110.

Note that counter 209 (in WR_COMMAND_MONITOR 208 which is monitoring WR_COMMAND and WC_READY) includes these self-initiated dummy commands in its count as well, incrementing when WC_READY and WR_COMMAND_VALID are both asserted such that the valid dummy command can be provided to system interconnect 110. As during normal operation, when WR_COMMAND_MONITOR 208 observes that W_RESPONSE_VALID is asserted, counter 209 is decremented. Dummy write commands are issued until all outstanding command placeholders in buffer 210 are drained (e.g. when the cmd_ptr and data_ptr match). This ensures that all outstanding data issued prior to the corresponding write commands and prior to the error is properly handled (by generating dummy commands to correspond to the outstanding write data). Since counter 209 keeps track of the number of outstanding write commands, either from command buffer 210 or dummy write commands generated for the placeholders in buffer 210, when counter 209 is back at zero, it is known that there are no more outstanding write transactions and WR_COMMAND_MONITOR 208 can assert WRITE_COMPLETE (in block 312 of FIG. 3) which is provided to SAFE_HANDSHAKE 202.

Similarly, in block 314, RD_COMMAND_MONITOR 206 can assert READ_COMPLETE when there are no more outstanding read transactions. READ_COMPLETE is also provided to SAFE_HANDSHAKE 202. Therefore, referring to block 316 of FIG. 3, after WRITE_COMPLETE and READ_COMPLETE are both asserted, SAFE_HANDSHAKE circuit 202 asserts SAFE_ACK which is provided to reset controller 108. Note that the operations of blocks 310/312 and 314 can overlap. That is, although handling outstanding read commands upon isolation is not addressed in detail in FIG. 3, the draining of outstanding read commands may be performed concurrently with the draining of outstanding write commands and write data.

In block 318, in response to receiving the asserted SAFE_ACK, reset controller 108 asserts reset1_b (to a logic level low, since it is an active low signal) to safely place lockstep unit 104 (and thus cores 116 and 118) into reset. Note that the remainder of system 100 need not be placed into reset due to the error within one core. In block 320, reset controller 108 lifts (i.e. negates) reset1_b so that lockstep unit 104 comes out of reset and starts normal operation again.

Figure 4:
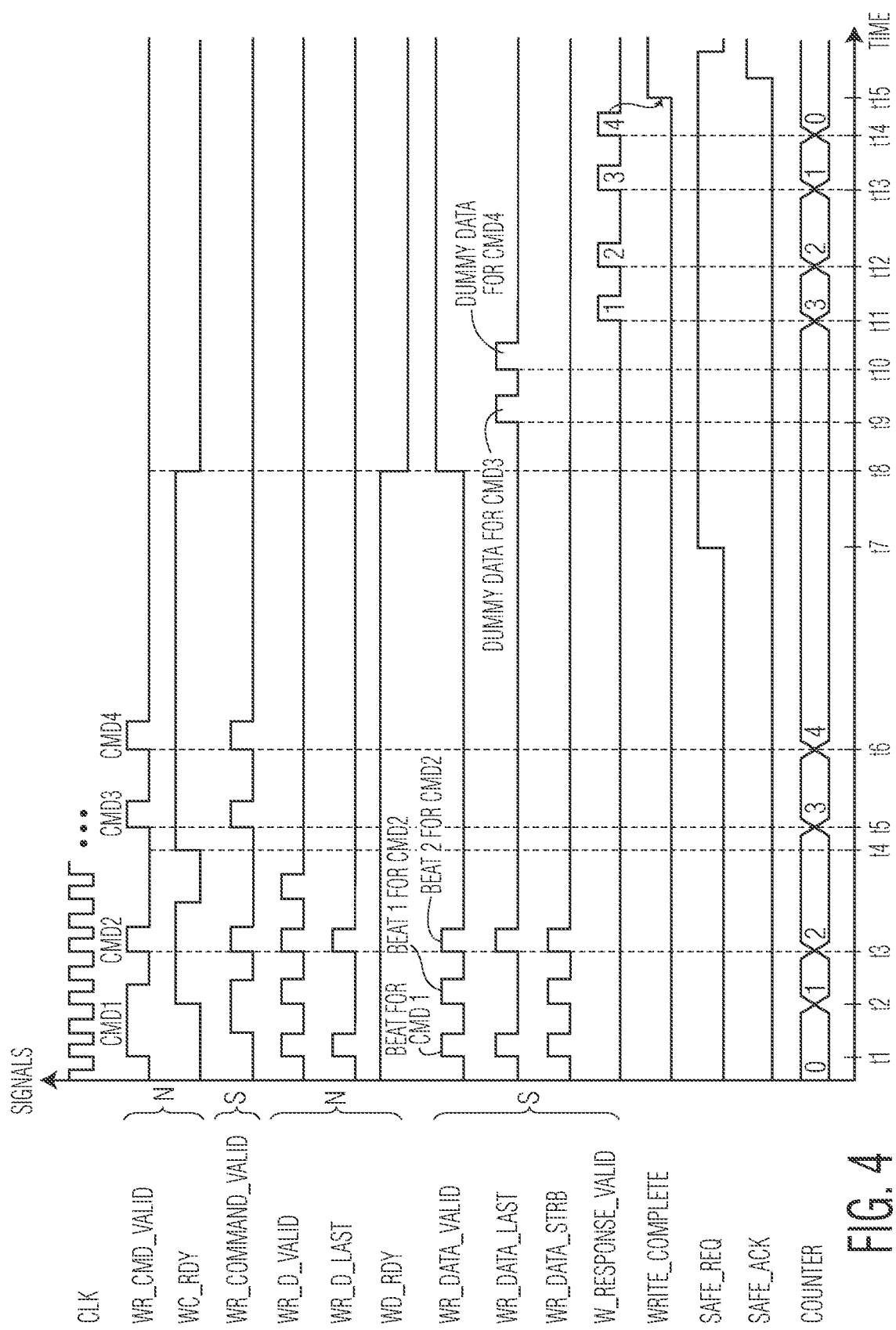
FIGS. 4-6 illustrate timing diagrams of example isolation and draining operations, in response to a lockstep error, within the data processing system of FIG. 1, in accordance with various embodiments of the present invention.
Figure 5:
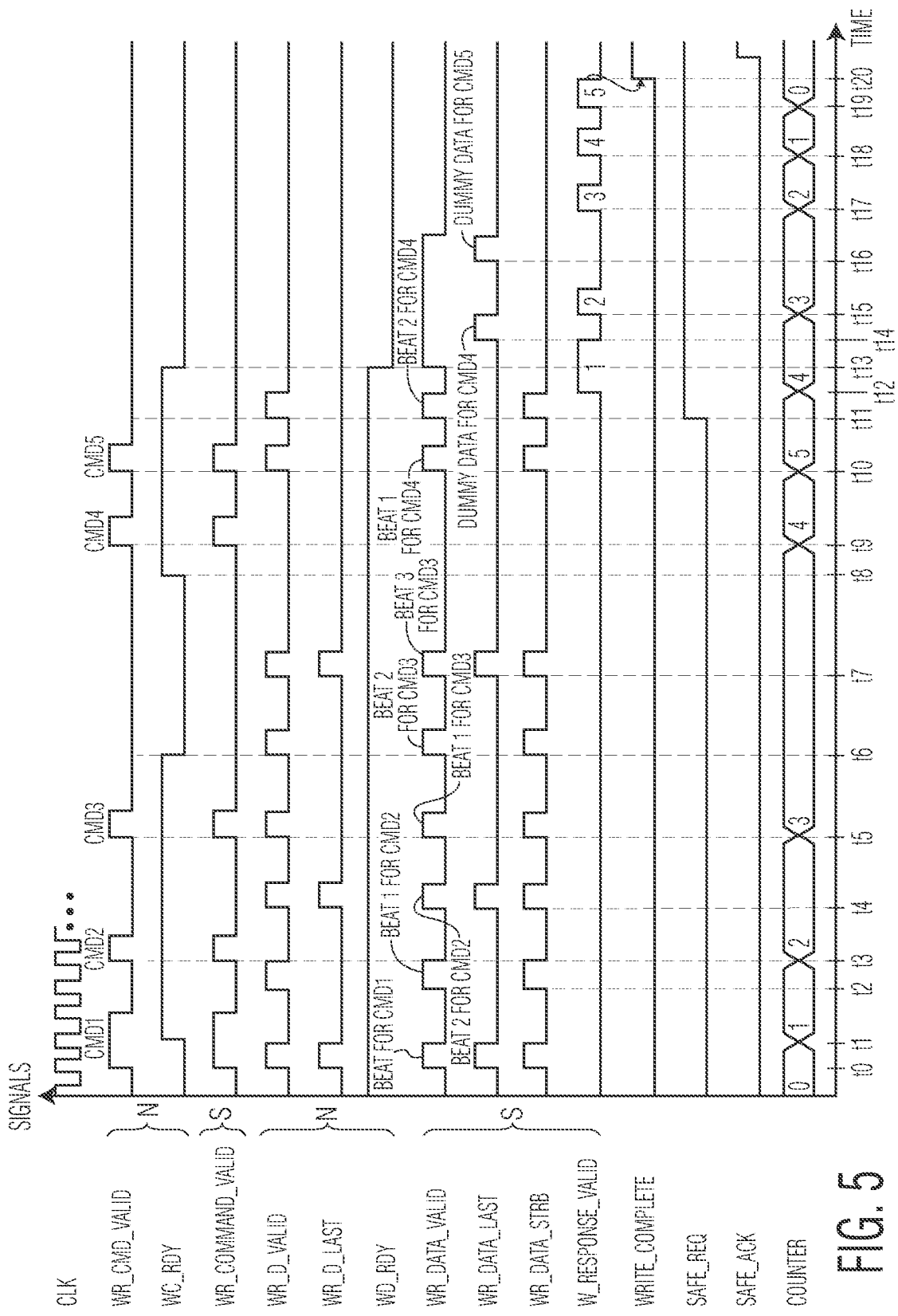
Figure 6:
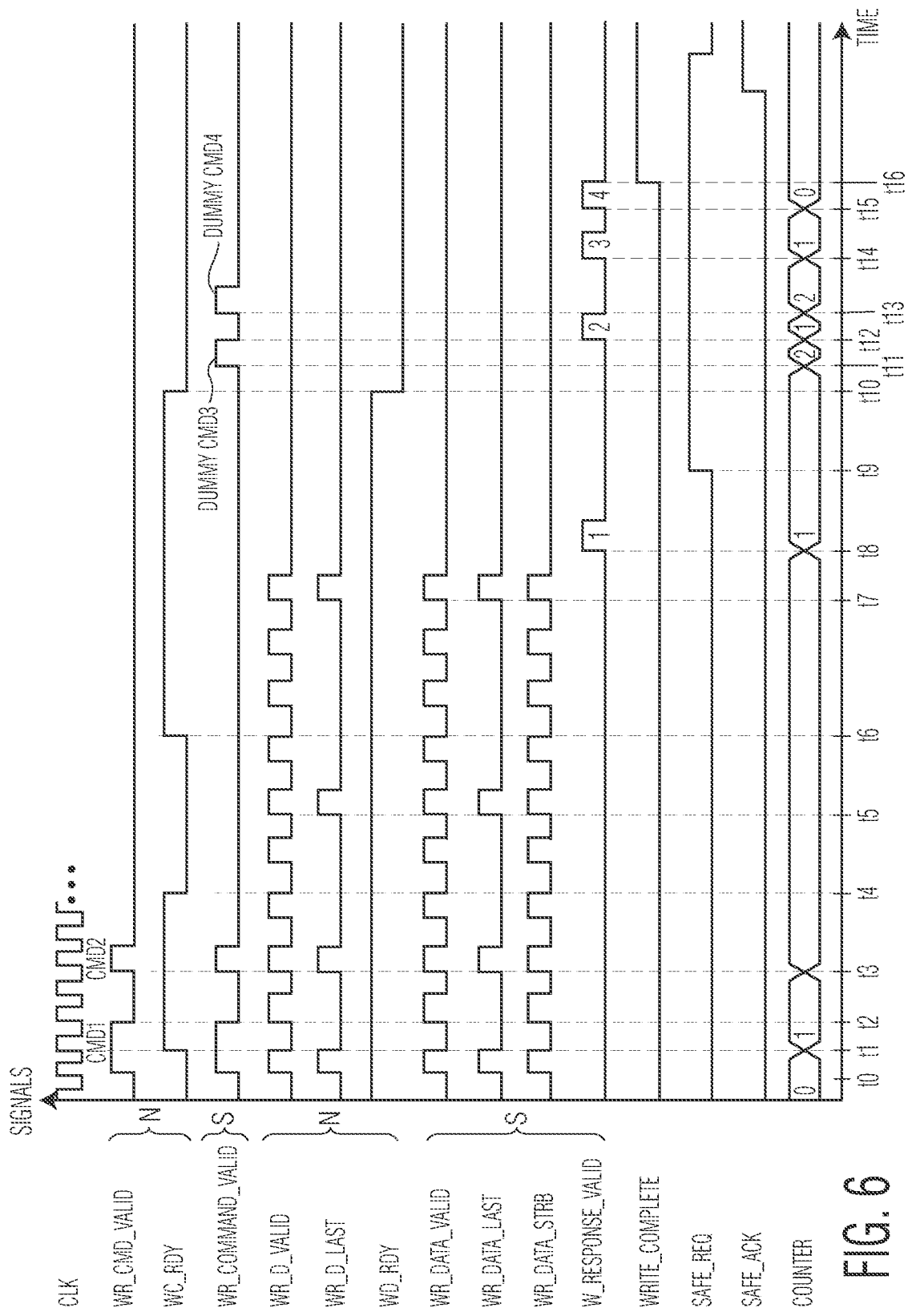

FIGS. 4-6 provide examples, in timing diagram form, of three different scenarios within system 100 in accordance with embodiments of the present invention. These examples will again be referring to core 116, lockstep unit 104, and bridge 120 within system 100. In each of the examples, in a bracket next to the signal names, an "N" indicates that the signals are at the north interface, i.e. as part of conductors 122, and an "S" indicates that the signals are at the south interface, i.e. as part of conductors 124.

In the examples of FIGS. 4-6, core 116 will be referred to as the faulty master or the faulty bus master. Note that in the descriptions that follow, if core 116 is not running in lockstep with another master, then each occurrence of "lockstep unit" can simply be replaced with "bus master" or "faulty bus master". Note also that only some signals of bridge 120 are illustrated in each of FIGS. 4-6, so as not to complicate the timing diagrams. Also, particular signals or indicators in a particular grouping of signals can be identified by the group name followed by "_" and the particular signal name. For example, the valid bit of WR_CMD (which includes a valid bit, the address, and the burst length), can be identified as WR_CMD_VALID. As another example, the last bit of WR_D or of WR_DATA can be identified as WR_D_LAST or WR_DATA_LAST, respectively. Also, in FIGS. 4-6, the data strobes are represented as a single signal, WR_DATA_STRB, which when asserted to 1 indicates that at least one of the bytestrobes is asserted and when negated to 0 indicates that no strobe is asserted.

In the scenario of FIG. 4, it is assumed that the bus master (corresponding to core 116 of lockstep unit 104), at the time of the error, has issued four outstanding burst write commands but has only issued all of the write data beats for the first two commands. In this case, buffer 210 stores all four of the outstanding write commands (CMD1, CMD2, CMD3, and CMD4), and since the data has been issued for only the first two commands, the data_ptr lags behind the cmd_ptr.

Referring to FIG. 4, at time t1, SAFE_REQ is negated, indicating that lockstep unit 104 is in normal operation, and counter 209 is at 0. Also at time t1, CMD1 has been placed on WR_CMD with WR_CMD_VALID asserted (and WR_CMD_VALID is provided via the first input of MUX 214 as WR_COMMAND_VALID). Also, the last beat of CMD1 has been issued with WR_D_VALID and WR_D_LAST asserted (also provided as WR_DATA_VALID and WR_DATA_LAST via MUX 218). With the write data, the corresponding strobe is asserted as well (illustrated by WR_DATA_STRB being asserted to 1). Since at time t1, WC_RDY is not yet asserted, CMD1 remains on WR_CMD (and WR_COMMAND) and cannot yet be provided to interconnect 110.

At time t2, WC_RDY is asserted, and with both WR_CMD and WC_RDY asserted, CMD1 is provided to interconnect 110 and counter 209 is incremented to 1. Also at time t2, a first beat for CMD2 is issued, but it is not the last beat of the CMD2 write. The corresponding strobe, WR_DATA_STRB, is also asserted with this beat of CMD2. Note that a beat of data for CMD2 arrived prior to CMD2 being issued. In this case, a write command placeholder is stored into buffer 210.

At time t3, the second burst write command is issued, CMD2. CMD2 with a burst length of 2 can be written into command buffer 210, overwriting the placeholder. Since both WR_CMD_VALID and WC_READY are asserted at time t2, CMD2 is issued to interconnect 110 and counter 209 is again incremented (since both CMD1 and CMD2 are currently outstanding). Also at time t3, the last beat for CMD2 is issued and the corresponding strb, WR_DATA_STRB, is asserted. No responses have been received yet on W_RESPONSE, therefore, none of the issued commands have yet been completed. At time t4, WC_RDY is asserted indicating system 110 is read to receive more commands. At times t5 and t6, CMD3 and CMD4 are issued, respectively, resulting in counter incrementing to 3 and 4, respectively.

At time t7, an error occurs within lockstep unit 104 and thus error indicator 132 is asserted. In response, reset controller 108 asserts SAFE_REQ. In response to the assertion of SAFE_REQ, SAFE_HANDSHAKE 202 isolates bridge 120 from core 116 (and thus from lockstep unit 104) by asserting safe_ctrl (regardless of any outstanding write or read transactions). With safe_ctrl asserted, all incoming read and write command channels and write data channels as well as read and write responses back to core 116 are isolated from core 116 by SAFE_ISOLATE circuits 204 and 220. For example, this may include SAFE_ISOLATE circuits 204 and 220 forcing a write response ready and a read response ready, respectively, (not illustrated) to interconnect 110 to zero so as to signify that the faulty core is no longer ready to accept new read/write responses. Also, in the illustrated embodiment, at time t8, WC_RDY and WD_RDY transition to zero.

With lockstep unit 104 isolated, bridge 120 operates to drain the commands still in command buffer 210 at the time SAFE_REQ was asserted. At the time SAFE_REQ is asserted, the cmd_ptr and data_ptr for buffer 210 can be used to determine the status of issued write commands and issued write data. In this example, at time t7, the cmd_ptr leads the data_ptr since cmd_ptr was incremented when WR_CMD_VALID was asserted for each of CMD1, CMD2, CMD3, and CMD4, and data_ptr was only incremented when WR_D_LAST was asserted for each of CMD1 and CMD2. Therefore, at time t7, command buffer 210 includes CMD1, CMD2, CMD3, and CMD4 since no responses have yet been received, and CMD3 and CMD4 are outstanding without corresponding issued data.

To complete the outstanding write commands, bridge 120 issues dummy writes for the remaining write commands. At time t8, WR_DATA_VALID is asserted in order to send out the beats of dummy data required to complete CMD3 and CMD4. WR_DATA_CTRL 216, using the burst length information stored in buffer 210, serially issues sparse dummy write data to interconnect 110 while maintain all byte strobes negated. For example, at times t9 and t10, the last beat of dummy data for CMD3 and CMD4 is sent out, respectively, with WR_DATA_LAST asserted each time. However, WR_DATA_STRB remains at 0, meaning that the dummy write data will not be written at the addressed locations in the memories provided by the corresponding write commands. (Note that only the last beats of dummy data are illustrated in FIG. 4 so as not to further complicate the timing diagram.)

At each of times t11-t14, W_RESPONSE_VALID is asserted indicating a response was received for each of CMD1-CMD4, respectively. This is indicated in FIG. 4 with the labels of 1-4 with each assertion of W_RESPONSE_VALID. With each assertion of W_RESPONSE_VALID, counter 209 is decremented, therefore, at time t14, upon receiving the response from the last outstanding write command, CMD4, counter 209 is again at 0. At this point, it is known that the outstanding commands have been drained, and WRITE_COMPLETE is asserted by WR_COMMAND_MONITOR 208. SAFE_HANDSHAKE circuit 202 also removes the isolation by negating safe_ctrl. After assertion of WRITE_COMPLETE (and READ_COMPLETE (not illustrated in FIG. 4)), SAFE_HANDSHAKE circuit 202 asserts SAFE_ACK (illustrated as occurring after t15). (At some point after SAFE_ACK is asserted, SAFE_REQ is negated, and at some point after SAFE_REQ is negated, SAFE_ACK is negated.) Also, after SAFE_ACK is asserted, reset controller 108 can place lockstep unit 104 into reset by asserting reset1_b to a 0. When reset controller 108 subsequently negates reset1_b to a 1, lockstep unit 104 can return to normal operation and start issuing new write commands. (In this scenario of FIG. 4, note that there was no outstanding issued write data without corresponding write commands at the time of the error.)

In the scenario of FIG. 5, it is assumed that the bus master (corresponding to core 116 of lockstep unit 104), at the time of an error, has issued five outstanding burst write commands but has only issued all of the write data beats for the first three commands and a portion of the data beats of the fourth command. In this case, at the time of the error, buffer 210 stores all five of the outstanding write commands (CMD1, CMD2, CMD3, CMD4, and CMD5), and since the data has been fully issued for only the first three commands, the data_ptr lags behind the cmd_ptr. Again, as with the scenario of FIG. 4, there is no outstanding issued write data without corresponding write commands at the time of the error. In FIG. 5, note that each of times t0-t20 occur in order, even though they may be described out of order.

At time t0, lockstep unit 104 is in normal operation, with SAFE_REQ negated, and counter 209 is at 0. Also, at time t0, the bus master issues CMD1 which is not provided to interconnect 110 until time t1 when WC_RDY is also asserted. At times t3, t5, t9, and t10, each of commands CMD2, CMD3, CMD4, and CMD5, respectively, are similarly issued. At each of these times, note that counter 209 is incremented such that at time t10, counter 209 indicates there are 5 outstanding write commands.

At times t1, t4, and t7, the last data beat of the write data for each of CMD1, CMD2, and CMD3, respectively, has been issued, with WR_DATA_VALID, WR_DATA_LAST, and WR_DATA_STRB all asserted each time. The data beat which occurs at time t2 is for the write data of CMD2, and the data beats which occur at time t5, and t6 are for the write data of CMD3, but they are not the last beats, therefore, WR_DATA_VALID and WR_DATA_STRB are asserted, but WR_DATA_LAST is negated for each of these beats.

At times t10 and t11, data beats for the write data of CMD4 are issued, neither of which are the last beat of the burst write data. However, at time t11, SAFE_REQ is also asserted in response to the occurrence of an error in lockstep unit 104. In response to assertion of SAFE_REQ, safe_ctrl is asserted to isolate bridge 120, as was described above in reference to the example of FIG. 4. With bridge 120 isolated from lockstep unit 104, draining of outstanding transactions can be performed.

The cmd_ptr and data_ptr for buffer 210 can be used to determine the status of write commands and write data at the time SAFE_REQ is asserted. In this example, the cmd_ptr is again ahead of the data_ptr since the cmd_ptr was incremented when WR_CMD_VALID was asserted for each of CMD1, CMD2, CMD3, CMD4, and CMD5, and the data_ptr was only incremented when WR_D_LAST was asserted for each of CMD1, CMD2, and CMD3. This indicates that the complete corresponding write data for CMD4 and CMD5 has not yet been issued.

Therefore, at time t11, command buffer 210 includes CMD1, CMD2, CMD3, CMD4, and CMD5 since no responses have yet been received, and CMD4 and CMD5 are outstanding without the complete corresponding issued data. In response to assertion of safe_ctrl, WR_DATA_CTRL 206 determines that the current burst write for CMD4 was not yet completed and can calculate the remaining beats of the ongoing burst write. In this example, it is assumed that CMD4 is a burst write of 4 beats, meaning that 2 beats are still remaining. Therefore, starting at time t13, WR_DATA_CTRL 216 issues dummy write data for the remaining 2 beats of CMD4 and for all the beats of CMD5. FIG. 5 illustrates the provision of the last beat of dummy data for CMD4 at time t14, and the last beat of dummy data for CMD5 and time t16. (Note that only the last beats of dummy data are illustrated in FIG. 5 so as not to further complicate the drawings.)

Each of CMD1-CMD5 receive a corresponding response, indicated by the corresponding assertions of W_RESPONSE_VALID (labeled "1"-"5"). Therefore, at time t12, the response for CMD1 is received, and thus counter 209 is decremented. At times t15, t17, t18, and t19, responses are received for CMD2-CMD5, respectively, and counter 209 is decremented each time. At time t19, counter 209 reaches 0, and WR_COMMAND_MONITOR 208 knows that all outstanding writes are complete and asserts WRITE_COMPLETE at time t20. After time t20 (after both WRITE_COMPLETE and READ_COMPLETE (not shown in FIG. 5)) are both asserted, HAND_SHAKE circuit 202 asserts SAFE_ACK, After assertion of SAFE_ACK, reset controller 108 can safely place lockstep unit 104 into reset. (The negation of SAFE_REQ occurs at some time after assertion of SAFE_ACK, but is not visible in the illustrated portion of the timing diagram in FIG. 5.)

In the scenario of FIG. 6, it is assumed that the bus master (corresponding to core 116 of lockstep unit 104), at the time of an error, has issued all the write data for four burst write commands but has only issued two of the four burst write commands. In this case, buffer 210 stores only two outstanding write commands (CMD1 and CMD2), and the data_ptr leads the cmd_ptr indicating write command placeholders have been created in buffer 210. In FIG. 6, note that each of times t0-t16 occur in order, even though they may be described out of order.

At time t0, lockstep unit 104 is in normal operation, with SAFE_REQ negated, and counter 209 is at 0. Also, at time t0, the bus master issues CMD1 which is not provided to interconnect 110 until time t1 when WC_RDY is also asserted. At time t3, CMD2 is issued. At each of times t1 and t3, counter 209 is incremented such that at time t3, counter 209 indicates there are 2 outstanding write commands.

At times t0, t3, t5, and t7, the last data beat of the write data for each of CMD1, CMD2, CMD3, and CMD4, respectively, has been issued, with WR_DATA_VALID, WR_DATA_LAST, and WR_DATA_STRB all asserted each time. The data beat which occurs at time t2 is for the write data of CMD2, but it is not the last beat, therefore, WR_DATA_VALID and WR_DATA_STRB are asserted, but WR_DATA_LAST is negated for this beat. It can be seen in FIG. 6 that CMD2 has a burst length of 2, CMD3 has a burst length of 3, and CMD4 has a burst length of 4. At time t8, W_RESPONSE_VALID is asserted, indicating that the response for CMD1 has been received. Therefore, counter 209 is decremented to 1, and CMD1 is removed from command buffer 210.

At time t9, SAFE_REQ is asserted in response to the occurrence of an error in lockstep unit 104. In response to assertion of SAFE_REQ, safe_ctrl is asserted to isolate bridge 120, as was described above in reference to the examples of FIGS. 4 and 5. With bridge 120 isolated from lockstep unit 104, draining of outstanding transactions can be performed.

The cmd_ptr and data_ptr for buffer 210 can be used to determine the status of write commands and write data at the time SAFE_REQ is asserted. In this example, the data_ptr is ahead of the cmd_ptr since the cmd_ptr was only incremented when WR_CMD_VALID was asserted for each of CMD1 and CMD2 (at times t0 and t3), and yet the data_ptr was incremented when WR_D_LAST was asserted for each of CMD1, CMD2, CMD3, and CMD4 (at times t0, t3, t5, and t7). WR_DATA_CTRL 216 asserts data_ptr_leading, which indicates that write data has been issued without the corresponding write commands having been issued at the time of the error.

Therefore, at time t9, command buffer 210 includes CMD2, as well as write command placeholders for CMD3 and CMD4. In this example, no dummy data needs to be issued, but instead, WR_COMMAND_CTRL 212 needs to issue dummy commands to take the place of CMD3 and CMD4. Therefore, at time t11, WR_COMMAND_CTRL 212 generates a first dummy command for CMD3 as described above and provides it via MUX 214 to interconnect 110 on WR_COMMAND (using a safe write address), with WR_COMMAND_VALID asserted. At time t11, counter 209 is incremented back to 2.

Prior to the next dummy command, at time t12, WR_RESPONSE_VALID is asserted indicating that the response for CMD2 has been received. Therefore, counter 209 is decremented back to 2. At time t13, WR_COMMAND_CTRL 212 generates a second dummy command for CMD4 as described above and provides it via MUX 214 to interconnect 110 on WR_COMMAND (using a safe write address), with WR_COMMAND_VALID asserted. At time t13, counter 209 is incremented back to 2.

At times t14 and t15, W_RESPONSE_VALID is asserted indicating that responses for CMD3 and CMD4 have been received, decrementing counter 209 each time. At time t15, counter 209 reaches 0, and WR_COMMAND_MONITOR 208 knows that all outstanding writes are complete (in which all outstanding data has been processed by issuing dummy commands) and asserts WRITE_COMPLETE and time t16. In response to assertion of both WRITE_COMPLETE and READ_COMPLETE (not illustrated in FIG. 6), SAFE_HANDSHAKE circuit 202 asserts SAFE_ACK. With SAFE_ACK asserted, reset controller 108 can safely reset lockstep unit 104. (The negation of SAFE_REQ occurs at some time after assertion of SAFE_ACK, but is not visible in the illustrated portion of the timing diagram in FIG. 5.)

Figure 7:
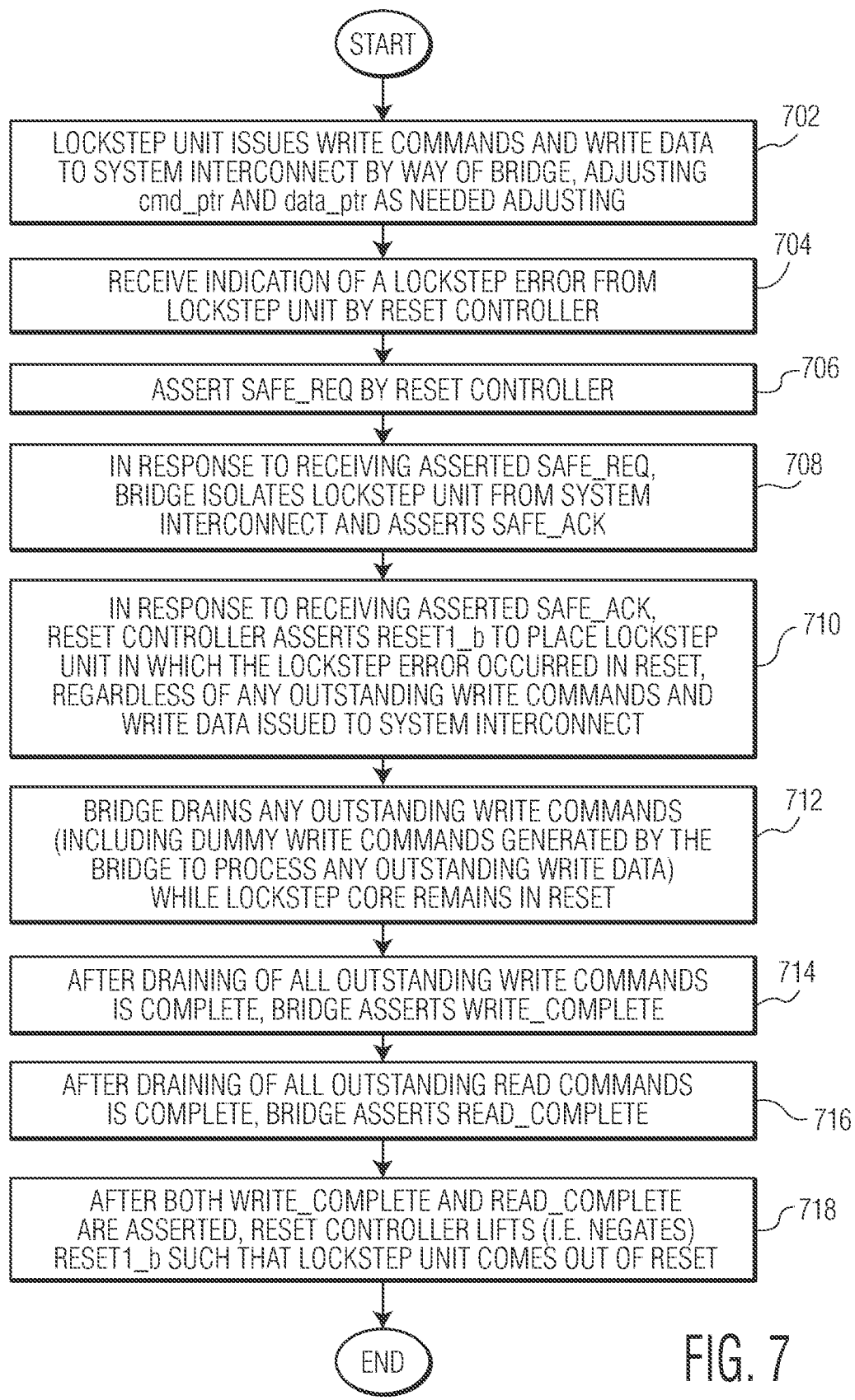
FIG. 7 illustrates, in flow diagram form, a method of responding to a lockstep error within the data processing system of FIG. 1, in accordance with one embodiment of the present invention.

FIG. 7 illustrates an alternate embodiment in which an alternate timing for the resetting the lockstep unit is used. Blocks 702, 704, and 706 are similar to blocks 302, 304, and 306 of FIG. 3, respectively. However, in the example of FIG. 7, in block 708, in response to receiving the asserted SAFE_REQ, in addition to the bridge isolating the lockstep unit with the faulty core, SAFE_HANDSHAKE circuit 202 also asserts SAFE_ACK to reset controller 108. Then, at block 710, in response to receiving the asserted SAFE_ACK, reset controller 108 can assert reset1_b (to 0) to place the lockstep unit in which the lockstep error occurred (e.g. lockstep unit 104) into reset, regardless of any outstanding write commands and write data issued to system interconnect 111.

In block 712, bridge 120 drains any outstanding write commands (including dummy write commands generated by the bridge to process any outstanding write data) while the lockstep core (e.g. core 116) remains in reset. Therefore, in this example, unlike the embodiment of FIG. 3, SAFE_ACK is asserted upon the bridge isolating the faulty core from the system interconnect rather than waiting until the assertion of both WRITE_COMPLETE and READ_COMPLETE. In this manner, as compared to the example of FIG. 3, the current example of FIG. 7 allows the lockstep unit (including the faulty core) to be placed into reset sooner, in which the draining of write commands is performed while the lockstep unit is in reset. Also, unlike the example of FIG. 3, the assertion of WRITE_COMPLETE and READ_COMPLETE is used to indicate when reset controller 108 can negate reset1_b such that the lockstep unit an come out of reset and resume normal operation.

While the embodiment of FIG. 7 allows for an earlier reset of the faulty core as compared to the embodiment of FIG. 3, the embodiment of FIG. 3 may allow for safer timing for placing a core or lockstep unit into reset. Note that alternate embodiments, along with performing fencing and draining for faulty cores, may use different timings for placing or lifting the faulty core into or out of reset.

Therefore, by now it can be appreciated how a bridge circuit between a master and a system interconnect can be used to finish outstanding write transactions upon occurrence of an error in the bus master without relying on the faulty master. Through the use of a dual port command buffer in the bridge with a cmd_ptr to keep track of outstanding write commands and a data_ptr to keep track of the status of issued write data with respect to issued write commands, the bridge can issue dummy write commands or dummy data to the system interconnect, as needed, to complete any outstanding transactions without violating the bus protocol of the system interconnect. After all outstanding transactions are completed, the faulty master can be safely reset.

The semiconductor substrate described herein can be any semiconductor material or combinations of materials, such as gallium arsenide, silicon germanium, silicon-on-insulator (SOI), silicon, monocrystalline silicon, the like, and combinations of the above.

As used herein, the term "bus" or "interconnect" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a "_b" following the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. Also for example, in one embodiment, the illustrated elements of system 100 are circuitry located on a single integrated circuit or within a same device. Alternatively, system 100 may include any number of separate integrated circuits or separate devices interconnected with each other. For example, memory 112 or 114 may be located on a same integrated circuit as the lockstep units or other bus masters or on a separate integrated circuit or located within another peripheral or slave discretely separate from other elements of system 100.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the fence and draining operations of the bridge can be applied to a bus master or core which is not running in lockstep with another master or core. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a system interconnect; a first master; and a bridge circuit coupled between the first master and the system interconnect. In this embodiment, the bridge circuit is configured to, in response to occurrence of an error in the first master, isolate the first master from the system interconnect, wherein the isolating by the bridge circuit is performed while the first master has one or more outstanding issued write commands to the system interconnect which have not been completed, and, after isolating the first master from the system interconnect, complete the one or more outstanding issued write commands while the first master remains isolated from the system interconnect. In one aspect, the bridge circuit is configured to complete the one or more outstanding issued write commands by providing dummy data to the system interconnect for each of the one or more outstanding write commands, wherein the each dummy data includes a negated strobe signal. In another aspect, a protocol of the system interconnect allows write data to be issued by the first master prior to issuing corresponding write commands for the issued write data, and wherein the isolating of the first master by the bridge circuit is performed while the first master has outstanding issued write data to the system interconnect for which corresponding write commands have not been issued. In a further aspect, the bridge circuit is configured to generate one or more dummy commands to the system interconnect for the outstanding issued write data. In yet a further aspect, each dummy command generated by the bridge circuit provides a pre-determined safe access address. In another aspect, the bridge circuit further includes a command buffer configured to store write commands issued from the first master to the system interconnect; and control circuitry configured to maintain a command pointer to keep track of the issued write commands and a data pointer to keep track of issued write data with respect to the issued write commands. In a further aspect, the control circuitry of the bridge circuit is configured to advance the data pointer and create a command placeholder when a first write data is issued by the first master prior to the first master issuing a corresponding write command for the first write data. In yet a further aspect, the first write data is a data beat for a burst write and has a corresponding control signal indicating it is a last beat for the burst write. In another aspect of this embodiment, the bridge circuit includes selection circuitry configured to provide issued write commands and write data from the first master unaltered to the system interconnect prior to occurrence of the error, and, after occurrence of the error, prevent newly issued write commands and write data from the first master from reaching the system interconnect. In a further aspect, the selection circuitry is configured to provide dummy commands and dummy data to the system interconnect after occurrence of the error while the first master is isolated from the system interconnect. In another aspect of this embodiment, the data processing system further includes a second master configured to operate in lockstep with the first master. In another aspect, the data processing system further includes a reset controller configured to place the first master into reset in response to the bridge circuit isolating the first master, wherein the bridge circuit completes the one or more outstanding issued write commands while the first master remains in reset.

In another embodiment, in a data processing system having a first master, a system interconnect, and a bridge circuit coupled between the first master and the system interconnect, a method includes issuing, by the first master, write commands and write data to the system interconnect via the bridge circuit wherein prior to occurrence of an error in the first master, the write commands and write data are provided unmodified to the system interconnect by the bridge circuit; and tracking, by the bridge circuit, issued write commands which have not been completed as outstanding write commands, wherein, after occurrence of the error in the first master, the bridge circuit isolates the first master from the system interconnect and completes the outstanding write commands while the first master remains isolated from the system interconnect. In one aspect of the another embodiment, after occurrence of the error in the first master, the bridge circuit completes the outstanding write commands by providing dummy data corresponding to each outstanding write command to the system interconnect so as to receive a corresponding valid response from the system interconnect to complete the outstanding write command. In a further aspect, the bridge circuit providing the dummy data corresponding to each outstanding write command to the system interconnect includes the bridge circuit providing a negated strobe signal with the dummy data. In yet a further aspect, each outstanding write command is an outstanding burst write command, and wherein, after occurrence of the error in the first master, the bridge circuit providing the dummy data corresponding to each outstanding burst write command to the system interconnect includes the bridge circuit providing all data beats, including a last data beat, for the outstanding burst write command to the system interconnect in which the negated strobe signal is provided with each data beat. In another aspect of the another embodiment, the issuing, by the first master, write command and write data to the system interconnect includes issuing, by the first master, write data prior to issuing corresponding write commands. In a further aspect, the tracking, by the bridge circuit, issued write commands as outstanding write commands comprises storing issued write commands into a command buffer, wherein the method further includes tracking, by the bridge circuit, write data issued prior to issuing the corresponding write commands as outstanding write data by storing corresponding placeholders in the command buffer for the outstanding write data. In yet a further aspect, the method further includes, after occurrence of the first error, the bridge circuit issuing a dummy command to the system interconnect corresponding to each placeholder stored in the command buffer so as to receive a corresponding valid response from the system interconnect to complete the dummy commands corresponding to the outstanding write data. In yet a further aspect, each dummy command includes a pre-determined safe access address.

What is claimed is:
1. A data processing system, comprising:
a system interconnect;
a first master;
a bridge circuit coupled between the first master and the system interconnect, wherein the bridge circuit is configured to:
in response to occurrence of an error in the first master, isolate the first master from the system interconnect, wherein the isolating by the bridge circuit is performed while the first master has one or more outstanding issued write commands to the system interconnect which have not been completed, and after isolating the first master from the system interconnect, complete the one or more outstanding issued write commands while the first master remains isolated from the system interconnect, wherein the bridge circuit is configured to complete the one or more outstanding issued write commands by providing dummy data to the system interconnect for each of the one or more outstanding write commands, wherein each dummy data includes a negated strobe signal.

2. The data processing system of claim 1, wherein a protocol of the system interconnect allows write data to be issued by the first master prior to issuing corresponding write commands for the issued write data, and wherein the isolating of the first master by the bridge circuit is performed while the first master has outstanding issued write data to the system interconnect for which corresponding write commands have not been issued.

3. The data processing system of claim 2, wherein the bridge circuit is configured to generate one or more dummy commands to the system interconnect for the outstanding issued write data.

4. The data processing system of claim 3, wherein each dummy command generated by the bridge circuit provides a pre-determined safe access address.

5. The data processing system of claim 2, wherein the bridge circuit comprises:
a command buffer configured to store write commands issued from the first master to the system interconnect; and
control circuitry configured to maintain a command pointer to keep track of the issued write commands and a data pointer to keep track of issued write data with respect to the issued write commands.

6. The data processing system of claim 5, wherein the control circuitry of the bridge circuit is configured to advance the data pointer and create a command placeholder when a first write data is issued by the first master prior to the first master issuing a corresponding write command for the first write data.

7. The data processing system of claim 6, wherein the first write data is a data beat for a burst write and has a corresponding control signal indicating it is a last beat for the burst write.

8. The data processing system of claim 1, wherein the bridge circuit comprises:
selection circuitry configured to:
provide issued write commands and write data from the first master unaltered to the system interconnect prior to occurrence of the error; and
after occurrence of the error, prevent newly issued write commands and write data from the first master from reaching the system interconnect.

9. The data processing system of claim 8, wherein the selection circuitry is configured to provide dummy commands and dummy data to the system interconnect after occurrence of the error while the first master is isolated from the system interconnect.

10. The data processing system of claim 1, further comprising a second master configured to operate in lockstep with the first master.

11. The data processing system of claim 1, further comprising:
a reset controller configured to place the first master into reset in response to the bridge circuit isolating the first master, wherein the bridge circuit completes the one or more outstanding issued write commands while the first master remains in reset.

12. In a data processing system having a first master, a system interconnect, and a bridge circuit coupled between the first master and the system interconnect, a method comprising: issuing, by the first master, write commands and write data to the system interconnect via the bridge circuit wherein prior to occurrence of an error in the first master, the write commands and write data are provided unmodified to the system interconnect by the bridge circuit; and tracking, by the bridge circuit, issued write commands which have not been completed as outstanding write commands, wherein, after occurrence of the error in the first master, the bridge circuit isolates the first master from the system interconnect and completes the outstanding write commands while the first master remains isolated from the system interconnect, wherein, after occurrence of the error in the first master, the bridge circuit completes the outstanding write commands by providing dummy data corresponding to each outstanding write command to the system interconnect so as to receive a corresponding valid response from the system interconnect to complete each outstanding write command.

13. The method of claim 12, wherein the bridge circuit providing the dummy data corresponding to each outstanding write command to the system interconnect comprises the bridge circuit providing a negated strobe signal with the dummy data.

14. The method of claim 13, wherein each outstanding write command is an outstanding burst write command, and wherein, after occurrence of the error in the first master, the bridge circuit providing the dummy data corresponding to each outstanding burst write command to the system interconnect comprises the bridge circuit providing all data beats, including a last data beat, for the outstanding burst write command to the system interconnect in which the negated strobe signal is provided with each data beat.

15. The method of claim 12, wherein the issuing, by the first master, write command and write data to the system interconnect comprises:
issuing, by the first master, write data prior to issuing corresponding write commands.

16. The method of claim 15, wherein the tracking, by the bridge circuit, issued write commands as outstanding write commands comprises storing issued write commands into a command buffer, wherein the method further comprises:
tracking, by the bridge circuit, write data issued prior to issuing the corresponding write commands as outstanding write data by storing corresponding placeholders in the command buffer for the outstanding write data.

17. The method of claim 16, further comprising:
after occurrence of the first error, the bridge circuit issuing a dummy command to the system interconnect corresponding to each placeholder stored in the command buffer so as to receive a corresponding valid response from the system interconnect to complete the dummy commands corresponding to the outstanding write data.

18. The method of claim 17, wherein each dummy command includes a pre-determined safe access address.

* * * * *